July 12, 1960   H. M. FOX   2,944,393
AERODYNAMIC BRAKING OF JET ENGINE AIRCRAFT
Filed April 15, 1955
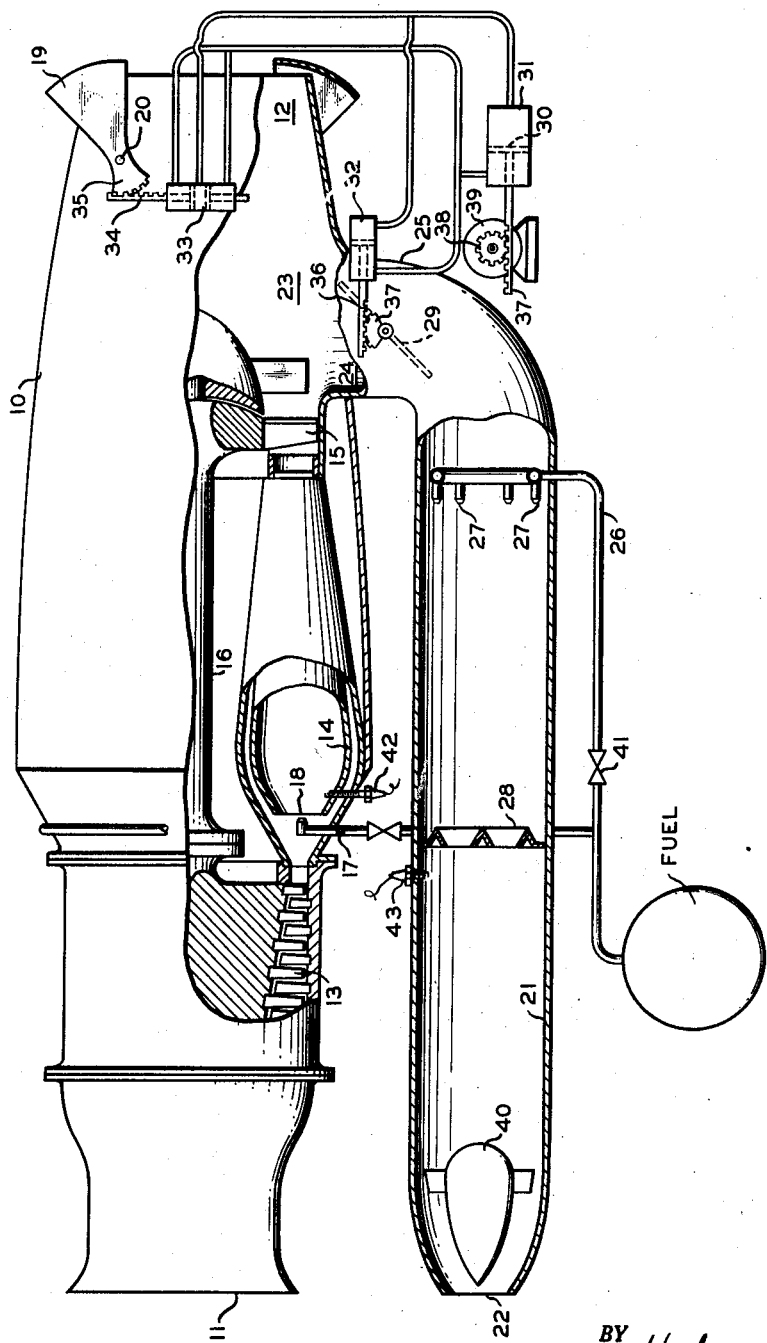
INVENTOR.
H.M. FOX
BY Hudson and Young
ATTORNEY

United States Patent Office 2,944,393
Patented July 12, 1960

2,944,393
AERODYNAMIC BRAKING OF JET ENGINE AIRCRAFT

Homer M. Fox, Bartlesville, Okla., assignor to Phillips Petroleum Company, a corporation of Delaware Filed Apr. 15, 1955, Ser. No. 501,626

4 Claims. (Cl. 60—35.54)

This invention relates to aerodynamic braking of jet engine aircraft. In one of its more specific aspects it relates to a method for producing a reverse thrust in a jet propelled aircraft at substantially constant combustion level in said aircraft engine. In another of its more specific aspects this invention relates to means for providing a reverse thrust to a jet propelled aircraft with substantially no increase in back pressure upon the combustion chamber of the aircraft engine. In still another of its more specific aspects it provides a means for providing a reverse thrust to a jet propelled aircraft in greater magnitude than the forward thrust developed.

The landing of jet propelled aircraft presents a problem of increasing rather than decreasing difficulties with the development of this type of aircraft. While both jet propelled and propeller propelled aircraft employ wheel rakes for controlling the aircraft after the initial touch down, the use of variable pitch propellers enables the pilot of a propeller propelled aircraft to reverse the pitch of the propeller so as to attain additional braking by means of the reverse thrust of the propeller. As jet propelled aircraft are developed for higher flying speeds, it has been inevitable that such aircraft have required higher landing speeds due to the decreased wing area and the increased weight of the aircraft and variable pitch propellers are not available for braking purposes in jet propelled aircraft.

One well known form of aircraft gas engine comprises a rotary compressor which is driven by a turbine so as to supply compressed air to a fuel combustion apparatus wherein motive fluid is generated by combustion of fuel and the products of combustion are expanded through the turbine and finally discharged through an exhaust nozzle so as to develop a forward propellant thrust. Ordinarily, the landing of an aircraft employing a power plant of this type is effected through a reduction in the forward speed of the aircraft by reducing the flow of fuel to the combustion chamber so as to reduce the degree of combustion and the thrust and this reduction of fuel flow also reduces the rotational speed of the compressor and turbine. A definite minimum mass flow through the engine must, however, be maintained so as to prevent extinguishment of the flame in the combustion chamber. The landing speed of a jet engine aircraft is usually very high and, with the present system of mechanically braking the wheels of the aircraft, extremely long landing space is required in order to land the aircraft safely.

Several systems for landing gas turbine aircraft have been proposed whereby the speed of the aircraft is reduced on approaching the landing surface and after touching down on the landing surface by means of directing a portion of the jet flow of exhaust gases forward in the direction of flight so as to produce a rearward thrust on the aircraft. Although the development of this rearward thrust or reverse thrust by the proposed systems permits the aircraft to land in a somewhat shorter distance, the magnitude of the thrust directed rearward is often times insufficient for really effective braking of the aircraft. It is very often desirable to effect a reduction in the forward speed of an aircraft without materially changing the level of combustion or the rotational speed of the compressor and turbine so that full power and rapid acceleration can be developed almost instantaneously in the event of sudden need, such as in the case of a plane approaching the deck of an aircraft carrier and encountering a wave-off signal. This is very difficult to do with the devices of the prior art. Also, it is desirable in the manuevering of aircraft by rapid acceleration and deceleration to maintain the state of operation of the power plant substantially constant.

It is an object of this invention to provide a method for producing a rearward thrust in a jet engine power plant at substantially constant combustion level in the combustion chamber and substantially constant rotational speed of the turbine and compressor.

It is an object of this invention to provide an apparatus for producing a rearward thrust in a jet engine power plant at substantially constant level of combustion in the combustion chamber and substantially constant rotational speed of the turbine and compressor.

It is another object of this invention to provide a jet engine power plant which permits an aircraft to be landed in a shortened landing distance and which increases the manueverability of the aircraft in flight.

It is still another object of this invention to provide a jet engine power plant in which a rearward thrust can be obtained which is greater in magnitude than the normal forward thrust of the engine.

The provision of an apparatus which is simple and positive in the regulation in the forward thrust of a jet propelled aircraft is still another object of this invention.

Still further objects and advantages will be apparent to one skilled in the art upon study of this disclosure including the drawing wherein:

A schematic illustration of an embodiment of this invention is presented.

The present invention provides a method and apparatus in an aircraft for regulating the forward thrust produced by a turbojet power plant and for supplying a rearwardly directed thrust from the power plant without interfering with the state of operation of the power plant. Broadly, the present invention provides a means for directing a thrust rearwardly to induce a braking action on the aircraft without affecting the level of combustion in the combustion chamber or the rotational speed of the compressor and turbine. Thus, the method of this invention maintains the power plant in a state of operation which is readily responsive to a possible demand for a rapid increase in forward thrust. The magnitude of the rearwardly and forwardly directing thrusts developed in the power plant of this invention can be controlled throughout a wide range of values and a rearward thrust exceeding the magnitude of the normal forward thrust can also be obtained. The apparatus of this invention accomplishes the control of the magnitude and the direction of the thrust developed in the power plant in a simple and positive manner.

The present invention provides a means for baffling or reducing the effective area of the rearwardly directing exhaust nozzle, a means for directing a portion or all of the combustion gas discharged from the turbine forward in the direction of flight of the aircraft to develop a rearward thrust, a means for controlling the proportion of exhaust gases to be discharged through the forwardly directing means coactive with the means for baffling the rearwardly directing exhaust nozzle in such a manner to maintain a substantially constant turbine discharge pressure, and a means for supplying and burning additional fuel in the forward directing means to augment the rearward thrust developed.

More specifically, this apparatus provides an exhaust duct which is communicative with the rearwardly directing exhaust nozzle of the power plant and which is open to the atmosphere, or can be opened to the atmosphere, in a forward direction to develop a rearward thrust through the discharge of exhaust gases diverted from the turbine exhaust system. The flow of gases into this forwardly directing exhaust duct is regulated by a control means, such as a control valve, located at the junction of the forwardly directing exhaust duct with the rearwardly directing exhaust duct in a manner not to affect the aerodynamic flow within the system. The means provided to baffle or reduce the effective area of the rearwardly directing exhaust nozzle may comprise a variable area exhaust nozzle or any other means known in the art. Ordinarily, this baffling means will only reduce the discharge of combustion gases from the rearwardly directing exhaust nozzle instead of completely stopping the discharge of these gases to reduce the forward thrust of the power plant. The degree of opening of this variable area nozzle is regulated in accordance with the position of the control valve governing the flow of exhaust gases into the forwardly directing exhaust duct in order to maintain the turbine discharge pressure substantially constant and thereby not affect the rotational speed of the turbine and compressor. The rearwardly directing thrust developed by the discharge of exhaust produced from the forwardly directing duct is augmented by the combustion of additional fuel within the forwardly directing duct so that a rearward thrust greater in magnitude than the forward thrust can be obtained when it is desired. The augmentation of the rearward thrust is accomplished by the combustion of fuel injected into the forwardly directing duct as in the conventional afterburner combustion system well known in the art. The rearward thrust developed is not augmented in all operations of the power plant because the rearward thrust obtained by diverting a portion of the combustion gases from the turbine exhaust system and discharging this gas from the power plant in a forward direction is sufficient in some operations. Ordinarily, the flow of fuel through the principal combustion chamber of the power plant is not changed when rearward thrust is developed.

As an example of the operation of my invention, reference is made to the drawing wherein one embodiment of this invention is illustrated in a diagrammatic drawing, partly in section. The turbojet engine comprises an outer casing structure 10 having an inlet end 11 and an exhaust nozzle 12 located at the opposite end. Mounted within the casing 10 along the longitudinal axis thereof is an axial flow compressor 13, annular fuel combustion apparatus 14 and a turbine 15, the rotor of which is operatively connected to the rotor of the compressor 13 by means of a shaft 16. Fuel is supplied to combustion apparatus 14 by line 17 and nozzle 18. Control of the effective area of exhaust nozzle 12 is provided by movable baffle plate 19 which is rotatably mounted on outer casing 10 by pins 20. The casing structure 10 is adapted to be mounted on or in the fuselage or wings of the aircraft with the intake opening 11 pointed in the direction of flight.

The forwardly directing duct of this invention comprises cylindrical casing 21, which has a discharge nozzle 22 at one end and is attached at the other end to the turbine discharge zone 23 of the engine through opening 24 in casing 10 by cylindrical section 25. Casing 21 is arranged with discharge nozzle 22 pointed in the direction of flight of the aircraft and is preferably located adjacent the engine, as shown in the drawing, but can be located at a distance from the engine if so desired. Fuel is supplied to the forwardly directing casing 21 by fuel line 26 and fuel nozzles 27, located in casing 21 upstream from flame holder 28. The flow of exhaust gas from the turbine discharge zone 23 of the turbojet engine is controlled by butterfly valve 29. The movement of baffles 19 and butterfly valve 29 is interrelated in such a manner that the effective area available for discharge of the combustion gas from the turbine discharge zone 23 remains substantially constant in all positions attained by baffles 19 and butterfly valve 29. This control can be advantageously effected hydraulically by movement of piston 30 in pressure cylinder 31 so as to transmit a force to pressure cylinders 32 and 33. The force transmitted to pressure cylinder 33 acts upon the opposed pistons within cylinder 33 so as to ratate baffles 19 through the movement of racks 34 and gear segments 35 which are rigidly attached to baffles 19 on the opposite side from pins 20 movably mounting baffles 19 onto casing 10. The force transmitted to pressure cylinder 32 also acts against a piston mounted therein so as to rotate butterfly valve 29 through the action of rack 36 and gear segment 37. Piston 30 can be caused to reciprocate within cylinder 31 through means of rack 37 and pinion 38 operated by motor 39. Motor 39 is a reversible motor and is operated by a manual switch (not shown).

A tail cone 40 is advantageously positioned in discharge nozzle 22.

The forwardly directed duct 21 is operated as an afterburner by opening valve 41 in fuel line 26 so as to admit fuel to nozzles 27 and ignite the added fuel by ignition means 43. Ignition means 42 and 43 can be a spark plug, a heated wire, a pilot flame, a powder charge or other known ignition means.

Better understanding of the invention may result from the following descriptive example of the operation of the embodiment illustrated in the drawing. In normal operation of the turbojet engine, such as in level flight of the aircraft utilizing the braking system of this invention, the baffles 19 are in fully open position and butterfly valve 29 substantially completely closes opening 24. No fuel is supplied to fuel nozzles 27 in forwardly directing duct 21.

When it is desired to utilize the braking system, such as in landing the aircraft, the operator manipulates the switch governing motor 39 so as to close baffles 19 and correspondingly to open butterfly valve 29 the amount required to provide the desired amount of braking. When the maximum amount of braking is required, motor 39 is caused to substantially completely close baffles 19 and to substantially open butterfly valve 29. The operator also opens manually controlled valve 41 so as to introduce fuel through nozzles 27 into the braking duct 21 so that braking duct 21 acts as an after-burner. The added fuel is ignited by igniter 43.

Maximum braking, as above described, will be required in emergencies only and for normal braking operations the operator will divert a minor portion of exhaust or combustin gases to the forwardly directed braking duct. The operator can, for example, divert the flow of exhaust gases so that 60 percent of the thrust is forward and 40 percent of the thrust is rearward so that there is a net forward thrust of 20 percent of the available thrust. Auxiliary fuel is then introduced into the braking duct and ignited so as to provide additional rearward thrust. The amount of braking can be varied and controlled by simply varying the flow of fuel to the braking duct. Ordinarily, the flow of fuel to the combustion chamber of the engine will not be varied during the braking operation.

Thus, I have provided means for braking a jet propelled aircraft which does not depend upon a delicate balance of diversion of flow of combustion products from the engine combustion chamber for rearward thrust but instead provides a separate source of combustion products for the braking that is required.

Reasonable variations and modifications are possible within the scope of the disclosure of the present invention, the essence of which is the provision of means to provide a reverse thrust to a turbojet engine by diverting at least part of the turbine discharge to a forwardly directed nozzle at substantially constant back pressure on the turbine and means for providing additional combustion products to the forwardly directed nozzle.

That which is claimed is:

1. A device for producing a reverse thrust at a substantially constant level of combustion to a continuous combustion power plant, wherein fuel is burned in a combustion chamber and the products of combustion are expelled through a reaction nozzle so as to provide thrust, which comprises auxiliary nozzle means positioned substantially parallel with and opposite to said reaction nozzle; conduit means communicating between said auxiliary nozzle and the interior of said power plant intermediate the combustion chamber and the reaction nozzle; first valve means positioned in said conduit means which closes said conduit means; fuel introducing means positioned in said conduit downstream from said first valve; second valve means operatively connected to said reaction nozzle which reduces the effective area of said reaction nozzle; valve control means operatively connected to said first and second valve means so as to open said first valve and to reduce the effective area of said second valve simultaneously so that the effective area available for discharge of combustion gas from the combustion chamber is maintained substantially constant whereby the pressure in the combustion chamber is maintained substantially constant and the thrust of the power plant is reversed; and fuel ignition means positioned in said conduit.

2. In a turbojet aircraft engine comprising a compressor, combustion chamber, turbine and exhaust nozzle, and aerodynamic braking device comprising a braking nozzle positioned substantially parallel with and opposite to said exhaust nozzle; a conduit connecting said braking nozzle and the interior of said engine at a point intermediate said turbine and said exhaust nozzle; valve means in said conduit which closes said conduit to the interior of said engine; fuel introducing means and ignition means positioned in said conduit downstream from said first valve; means associated with said exhaust nozzle; and control means operatively connected to said nozzle which reduces the effective area of said exhaust valve means and said means for reducing the effective area of said exhaust nozzle so as to maintain the effective area available for discharge of combustion gas from the combustion chamber substantially constant and to divert the exhaust gases from one nozzle to another at substantially constant exhaust gas pressure.

3. In a turbojet aircraft engine comprising a compressor, combustion chamber, turbine, turbine discharge section and exhaust nozzle, the improvement comprising a braking nozzle positioned substantially parallel with and opposite to said exhaust nozzle and having a cross-sectional area at least as large as that of the exhaust nozzle; a conduit of greater cross-sectional area than said braking nozzle operatively connecting the turbine discharge section with said braking nozzle; valve means in said conduit which closes said conduit to said turbine discharge section; closure means associated with said exhaust nozzle which closes said nozzle; means which closes said closure means and opens said valve simultaneously so that the cross-sectional area of the path of the gases from the turbine to the atmosphere is substantially constant; means which introduces fuel to said conduit; and means for igniting fuel in said conduit.

4. In a turbojet aircraft engine comprising a compressor, combustion chamber, turbine, turbine discharge section and exhaust nozzle, the improvement comprising a braking nozzle positioned substantially parallel with and opposite to said exhaust nozzle; a conduit of great cross-sectional area than said braking nozzle operatively connecting said turbine discharge section with said braking nozzle; a tail cone positioned in said braking nozzle; a plurality of fuel nozzles positioned in said conduit so as to direct fuel toward said braking nozzle; a flame holder in said conduit downstream from said fuel nozzles; means which ignites said fuel downstream from said flame holder; valve means positioned in said conduit adjacent said turbine discharge section; closure means associated with said exhaust nozzle which closes said nozzle; and means which closes said closure means and opens said valve simultaneously so that the total effective cross-secetional area of the exhaust nozzle and braking nozzle is maintained substantially constant.

References Cited in the file of this patent

UNITED STATES PATENTS

| 2,280,835 | Lysholm | Apr. 28, 1942 |
| 2,647,367 | Sedille | Aug. 4, 1953 |
| 2,658,334 | Marchant | Nov. 10, 1953 |
| 2,714,287 | Carr | Aug. 2, 1955 |

FOREIGN PATENTS

| 145,864 | Australia | Oct. 17, 1946 |
| 860,754 | Germany | Dec. 22, 1952 |
| 732,127 | Great Britain | June 22, 1955 |

UNITED STATES PATENT OFFICE
CERTIFICATE OF CORRECTION

Patent No. 2,944,393                      July 12, 1960

Homer M. Fox

It is hereby certified that error appears in the printed specification of the above numbered patent requiring correction and that the said Letters Patent should read as corrected below.

Column 5, line 31, for "and" read -- an --; line 40, after "nozzle" insert -- which reduces the effective area of said exhaust nozzle --; line 41, strike out "nozzle which reduces the effective area of said exhaust"; column 6, line 21, for "great" read -- greater --; line 34, for "secetional" read -- sectional --.

Signed and sealed this 31st day of January 1961.

(SEAL)
Attest:

KARL H. AXLINE                      ROBERT C. WATSON
Attesting Officer                      Commissioner of Patents